(12) United States Patent
Cacenco et al.

(10) Patent No.: US 8,200,713 B2
(45) Date of Patent: Jun. 12, 2012

(54) DATABASE EXPLORATION FOR BUILDING WIRELESS COMPONENT APPLICATIONS

(75) Inventors: Michael Cacenco, Brampton (CA); Christopher Smith, Burlington (CA); Kenneth Wallis, Oakville (CA)

(73) Assignee: Research In Motion Limited, Waterloo (CA)

( * ) Notice: Subject to any disclaimer, the term of this patent is extended or adjusted under 35 U.S.C. 154(b) by 680 days.

(21) Appl. No.: 12/038,859

(22) Filed: Feb. 28, 2008

(65) Prior Publication Data

US 2009/0222471 A1 Sep. 3, 2009

(51) Int. Cl.
G06F 17/30 (2006.01)
G06F 9/44 (2006.01)

(52) U.S. Cl. .................. 707/803; 707/802; 717/124

(58) Field of Classification Search .................. 707/802, 707/803, 999.102; 717/124
See application file for complete search history.

(56) References Cited

U.S. PATENT DOCUMENTS

| | | | | |
|---|---|---|---|---|
| 5,809,509 A * | 9/1998 | Blackman et al. | | 1/1 |
| 5,826,076 A * | 10/1998 | Bradley et al. | | 1/1 |
| 6,006,216 A * | 12/1999 | Griffin et al. | | 1/1 |
| 6,044,216 A * | 3/2000 | Bhargava et al. | | 717/114 |
| 6,199,195 B1 * | 3/2001 | Goodwin et al. | | 717/104 |
| 6,236,994 B1 * | 5/2001 | Swartz et al. | | 707/635 |
| 6,341,288 B1 * | 1/2002 | Yach et al. | | 1/1 |
| 6,857,123 B1 * | 2/2005 | Nuxoll et al. | | 719/316 |
| 6,928,640 B2 * | 8/2005 | Schlussman | | 717/137 |
| 6,980,995 B2 * | 12/2005 | Charlet et al. | | 1/1 |
| 6,996,557 B1 * | 2/2006 | Leung et al. | | 1/1 |
| 7,031,956 B1 * | 4/2006 | Lee et al. | | 1/1 |
| 7,072,896 B2 * | 7/2006 | Lee et al. | | 1/1 |
| 7,289,997 B1 * | 10/2007 | Kita et al. | | 1/1 |
| 2003/0041180 A1 * | 2/2003 | Schlussman | | 709/328 |
| 2003/0212705 A1 * | 11/2003 | Williamson et al. | | 707/103 R |
| 2004/0019600 A1 * | 1/2004 | Charlet et al. | | 707/102 |
| 2004/0083453 A1 * | 4/2004 | Knight et al. | | 717/113 |
| 2004/0103073 A1 * | 5/2004 | Blake et al. | | 707/1 |
| 2004/0193644 A1 * | 9/2004 | Baker et al. | | 707/104.1 |
| 2005/0246717 A1 * | 11/2005 | Poole et al. | | 719/316 |
| 2006/0136351 A1 | 6/2006 | Angrish et al. | | |

(Continued)

FOREIGN PATENT DOCUMENTS

EP 1569106 A 8/2005

OTHER PUBLICATIONS

Lakshman, Bulusu, "Chapter 2: Cursors", Oracle9i PL/SQL: A Developer's Guide, Apress, © 2003, 64 pages.*

(Continued)

Primary Examiner — Robert Stevens
(74) Attorney, Agent, or Firm — Gowling Lafleur Henderson LLP

(57) ABSTRACT

A method is disclosed for facilitating development of an application having access to a database data-source. The method comprises the following steps. At least one subroutine that is a candidate for potentially including hidden information is identified. A definition document for the subroutine is generated using information available from its available schema metadata. The subroutine is executed via the database data-source. A result set of the executed subroutine is analysed for exposing any hidden information. The analysis is used to supplement the definition document with additional schema information to describe a structure of the exposed information. The definition document can then be used in developing the application. A development tool and computer readable medium configured to implement the method are also disclosed.

20 Claims, 4 Drawing Sheets

U.S. PATENT DOCUMENTS

| | | |
|---|---|---|
| 2007/0011605 A1 | 1/2007 | Dumitru et al. |
| 2007/0055647 A1* | 3/2007 | Mullins et al. ............... 707/2 |
| 2007/0094302 A1* | 4/2007 | Williamson et al. ...... 707/103 R |
| 2007/0156740 A1* | 7/2007 | Leland et al. ............... 707/102 |

OTHER PUBLICATIONS

Dorneich, A., et al., "Embedded Predictive Modeling in a Parallel database", SAC '06, Dijon, France, Apr. 23-27, 2006, pp. 569-574.*

Brandt, Cynthia A., et al., "Metadata-driven creation of data marts from an EAV-modeled clinical research database", International Journal of Medical Informatics, vol. 65, No. 3, Nov. 12, 2002, pp. 225-241.*

Widener, Patrick, et al., "Open Metadata Formats: Efficient XML-Based Communication for High Performance Computing", Cluster Computing, vol. 5, Kluwer Academic Publishers, The Netherlands, © 2002, pp. 315-324.*

Extended European Search Report issued by the European Patent Office dated Sep. 18, 2008 for corresponding European Patent Application No. 08152061.1, 6 pages.

* cited by examiner

DATABASE EXPLORATION FOR BUILDING WIRELESS COMPONENT APPLICATIONS

The present invention relates generally to constructing applications for executing on a communication device, and specifically to a system and method for exploring databases to comprehensively develop an application capable of accessing the databases.

BACKGROUND

There are continually increasing number of mobile communication devices in use today, including, for example, smart phones, personal digital assistants (PDAs) with wireless capabilities, personal computers, self-service kiosks and two-way pagers. Accordingly, software applications are being developed to execute on these devices and increase their utility. For example, a smart phone may include an application which retrieves the weather for a range of cities, or a PDA which may include an application that allows a user to shop for groceries. Such software applications take advantage of connectivity to a communication network in order to provide timely and useful services to users of the communication devices.

However, due to limited resources of many devices, as well as the complexity and expense required to deliver large amounts of data to the devices, developing and maintaining software applications tailored for a variety of devices remains a difficult and time-consuming task.

Further, with the proliferation of wireless communication devices, there is an increased demand to quickly and easily develop client applications that support access to one or more backend servers. Therefore, it is often the case that the application is developed independently of the required interface to the backend server.

Accordingly, component applications and methods for developing and implementing such applications have been introduced. Details regarding component application can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Based Wireless Applications" and published as WO2004059939, each of which is assigned to the owner of the present application.

As described in these applications, a data-source can be made available to application developers by publishing a data-source schema. The data-source schema is used to facilitate access to the data-source. As further described, a development tool could use the data-source schema to automatically generate components of the component application.

Standard exploration of a data-source schema and metadata allows the development tool to create operations based on stored-procedures and user-functions relying on the parameters/returned value definitions.

However, a stored procedure in a database may include implicit result sets, undeclared in the corresponding data-source schema, or weak cursors as parameters in the declaration. Typically, tools that access the database operate with such entities using a result structure that is known a priori and the application is modeled after the established structure. However, there is no known tool that facilitates developing an application capable of communicating with a database data-source when the result structure is unknown.

Accordingly, it is an object to obviate or mitigate at least some of the above-presented disadvantages.

BRIEF DESCRIPTION OF THE DRAWINGS

An embodiment of the present invention will now be described by way of example only with reference to the following drawings in which.

DETAILED DESCRIPTION OF THE PREFERRED EMBODIMENT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

In accordance with one embodiment there is provided a method for facilitating development of an application having access to a database data-source, the method comprising the steps of: identifying at least one subroutine that is a candidate for potentially including hidden information; generating a definition document for the subroutine using information available from its available schema metadata; executing the subroutine via the database data-source; analysing a result set of the executed subroutine for exposing any hidden information; and using the analysis to supplement the definition document with additional schema information to describe a structure of the exposed information, the definition document for use in developing the application.

In accordance with another embodiment, there is provided a computer readable medium comprising instructions which, when executed by a computing device, cause the computing device to implement the method above.

In accordance with another embodiment, there is provided a computing device configured to implement an application development tool for facilitating development of an application having access to a database data-source, the application development tool providing the computing device with: means for identifying at least one subroutine that is a candidate for potentially including hidden information; means for generating a definition document for the subroutine using information available from its available schema metadata; means for executing the subroutine via the database data-source; means for analysing a result set of the executed subroutine for exposing any hidden information; and means for using the analysis to supplement the definition document with additional schema information to describe a structure of the exposed information, the definition document for use in developing the application.

Figure 1:
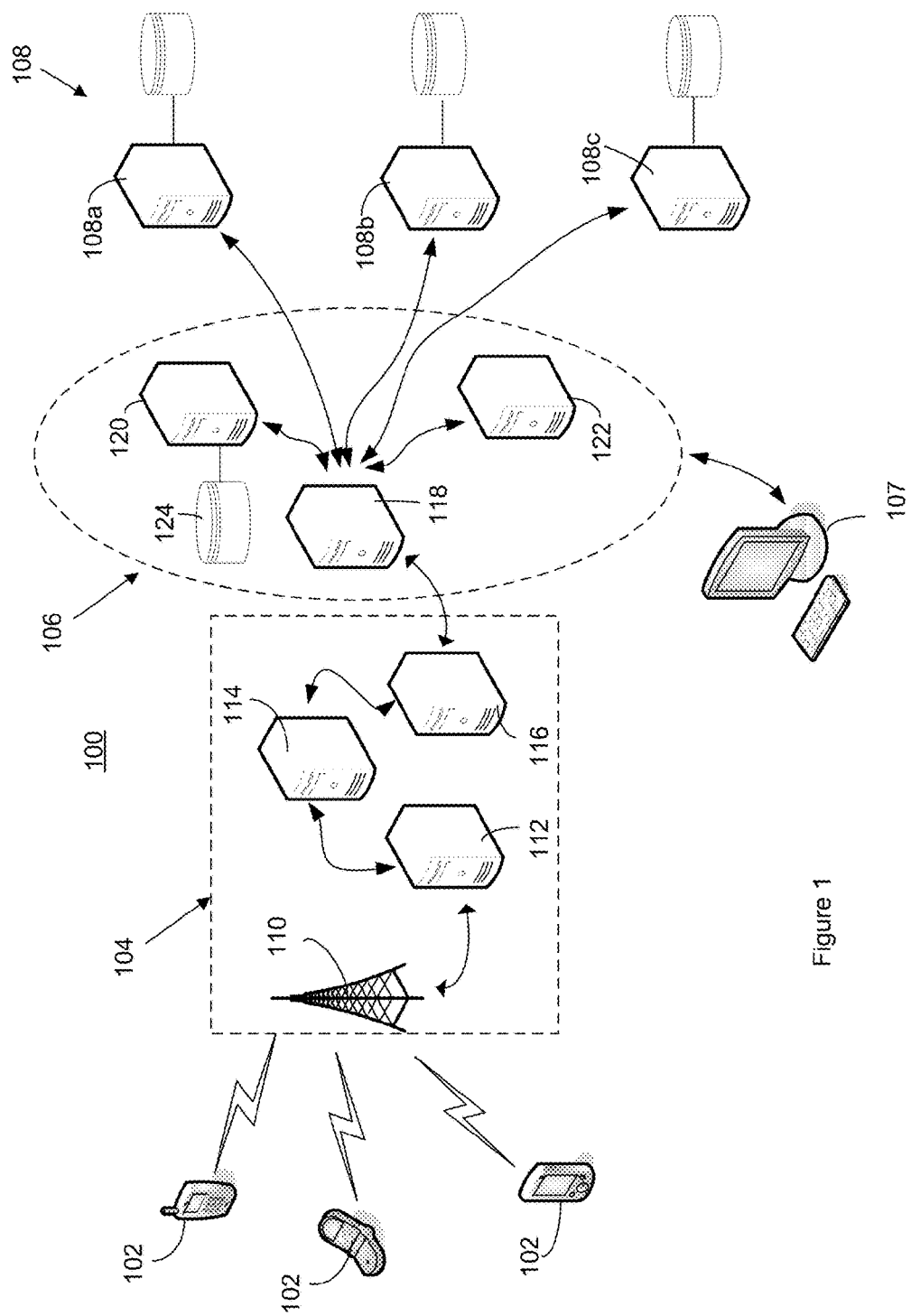
FIG. 1 is a block diagram of a communication network infrastructure.

For convenience, like numerals in the description refer to like structures in the drawings. Referring to FIG. 1, a communication infrastructure is illustrated generally by numeral 100. The communication infrastructure 100 comprises a plurality of communication devices 102, or simply devices 102, a communication network 104, an application gateway 106 and a plurality of data-sources 108.

The devices 102 may include both wired and wireless computing devices such as a desktop computer, a notebook or other portable computer, a smart phone, a personal digital assistant (PDA), and the like. The devices 102 are in communication with the application gateway 106 via the communication network 104. Accordingly, the communication network 104 may include several components such as a wireless network 110, a relay 112, a corporate server 114 and/or a mobile data server 116 for relaying data between the devices 102 and the application gateway 106.

The application gateway 106 comprises a gateway server 118, a provisioning server 120, a discovery server 122 and a repository 124. The gateway server 118 is in communication with both the provisioning server 120 and the discovery server 122. The gateway server 110 is further in communication with a plurality of the data-sources 108, such as Web services 108a, database services 108b, as well as other enterprise services 108c, via a suitable link. For example, the gateway server 110 is connected with the Web services 108a and database services 108b via Simple Object Access Protocol (SOAP) and Java Database Connectivity (JDBC) respectively. Other types of data-sources 108 and their corresponding links will be apparent to a person of ordinary skill in the art. Accordingly, it can be seen that the gateway server 118 acts as a message broker between the devices 102 and the data-sources 108.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Applications are provided for execution on the wireless devices 102. The applications are stored in a repository 124 as a series of packages, or bundles. The packages are typically created by an application developer using a design tool provided in an application development environment 107. The design tool provides support for a drag-and-drop graphical approach for visual design of application components including screens, data elements, messages and application workflow logic, as described in the previously referenced documents.

The application packages are represented as structured data, such as Extensible Mark-up Language (XML), that can be generated automatically by the design tool through an automatic code generation process. The design tool further enables the automatically-generated code to include, or be otherwise augmented by, an industry standard scripting language, such as JavaScript or another scripting/programming language known in the art.

The availability of application packages in the repository 124 is published in a registry via a discovery service provided by the discovery server 122. It is recognized that there can be more than one repository 124 and associated registries used by the gateway server 118.

Once again, the design tool is operated in an application development environment 107 executing on a computer. The development methodology of the design tool can be based on a visual "drag and drop" system of building application models.

The design tool can be structured as a set of plug-ins to a generic integrated design environment (IDE) framework, such as, for example, the Eclipse™ framework. Alternatively, the tool can be configured as a complete design framework without using a plug-in architecture.

In a co-pending application, a design tool is described that automatically creates components of a component application based on a published document. The published document may take a standard form, such as Web Services Definition Language (WSDL), and is representative of services offered by a corresponding data-source 108. The design tool creates the relevant message components, data components, screen components and the like for use by a developer. The developer has the option to further develop these components, as well as incorporate them into an existing application or create a new application based on them.

As previously described, when the data-source 108 is a database 108b, there is typically no published document describing the result structure from the database. Rather, standard exploration of database 108b schema and metadata allows the design tool to create operations based solely on the parameters and/or returned value definitions of stored-procedures and user-functions. For ease of explanation, stored-procedures and user-functions will be referred to generically as subroutines.

However, such information often fails to provide sufficient data regarding the result set, so the corresponding components cannot be properly constructed. Specifically, when a subroutine includes hidden information, the information cannot be determined by the design tool. Examples of hidden information include weak cursors and implicit result sets.

Oracle databases allow the use of weak cursors as in input/output parameter. A weak cursor is a cursor that is declared as a parameter or function return, but the cursor structure in not declared in the schema or package. MS SQL Server and DB2 databases allow for implicit result sets which are not even declared as parameters or function returns. Accordingly, it is apparent that such hidden information cannot be readily determined by the design tool.

Accordingly, the design tool is provided with a connector that facilitates connection to a database data-source 108b. Once connected, the design tool explores the database data-source 108b and wraps the schema definition of the database data-source 108b into a WSDL document simulating Web Service behaviour. That is, the design tool creates WSDL operations based on the defined parameters and/or return values of the subroutines.

Additionally, the design tool includes a data-source wizard that facilitates further exploration of candidate subroutines by running them using test input data and analyzing the response metadata. In this manner, implicit result sets or weak-cursors can be revealed and proper schema structures can be created to enhance the previously created WSDL operations. The schema structures will be based on the data expected in response to an operation based on such a procedure.

Once the result data structure is known, further client application development becomes possible allowing proper display, matching collections, script processing and adding features like pagination support.

Figure 2:
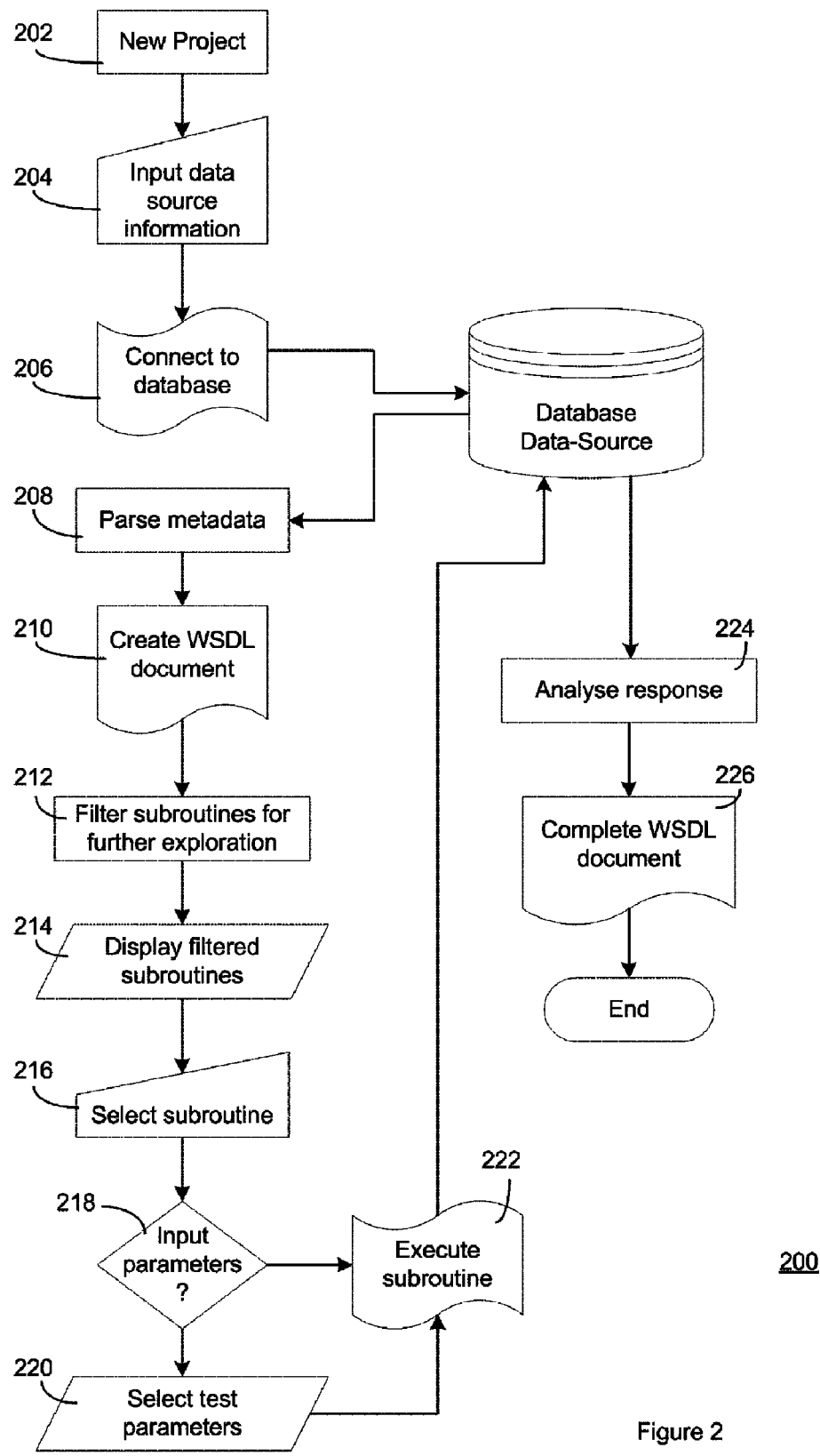
FIG. 2 is a flow chart illustrating operation of a data-source wizard.

Referring to FIG. 2, a flowchart illustrating operation of the data-source wizard is illustrated generally by numeral 200. In step 202, a developer initializes the data-source wizard. This can be achieved a number of different ways, including starting a new project or selecting an "add data-source" option from an option menu.

In step 204, the developer identifies the data-source as a database and inputs related information such as the type of database, Uniform Resource Locater (URL) of the data-source, schema and connection information. The user could enter this information manually or direct the data-source wizard to a file that includes the relevant information.

In step 206, the data-source wizard uses the information to connect to the database data-source 108b and retrieve the schema metadata for the database. In step 208, the schema metadata is parsed to identify the subroutines exposed by the database data-source 108b.

In step 210, a WSDL document is created based on the identified subroutines. Specifically, each subroutine is exposed by a declaration that includes the input parameter and may include the output parameters. Accordingly, WSDL operations and messages based on these parameters can be created in the WSDL document. However, as previously discussed, if a subroutine includes implicit result sets or weak-cursors, its structure cannot be properly determined simply by analysing the declarations.

Therefore, in step 212 the data-source wizard filters the subroutines to determine which of them should be explored further. For all database types, the subroutines that cannot be handled by the data-source wizard are filtered out. For databases, such as Oracle, that allow weak cursors, the data-source wizard identifies declarations that include weak cursors as candidates for further exploration. For databases, such as MSSQL and DB2, that allow implicit data sets, it is not possible to determine whether or not such data results will be present from analysis of the declaration alone. Accordingly, all subroutines for such databases that can be handled by the data-source wizard are candidates for further exploration.

At step 214, the candidate subroutines for further exploration are displayed to the developer. In the present embodiment the candidate subroutines are displayed in a tree-view for selection. In step 216, the developer selects a desired candidate subroutine and triggers further explorations by pressing a hotkey or selecting a menu item.

In step 218, the data-source wizard determines from the declaration whether or not input parameters are required for the subroutine. If no input parameters are required, the data-source wizard continues to step 222. If input parameters are required, the data-source wizard continues to step 220.

In step 220, test input parameters are selected for the subroutine. The input parameters may be selected automatically by the data-source wizard, in which case random variables are selected to match the type required in the declaration. Alternatively, the developer is presented with dialog box that displays the parameters and allows developer input. Once the input parameters have been selected the data-source wizard continues to step 222.

In step 222, the data-source wizard uses the existing connection, created in step 206, to execute the selected subroutine. The database data-source 108b executes the subroutine using the input parameters, if applicable, and returns a corresponding result set metadata.

In step 224, the result set metadata is analysed to determine if there is any hidden data in the result set. Specifically, for databases, such as Oracle, that allow weak cursors, the data-source wizard identifies the weak cursor parameter and analyses the corresponding metadata to determine the structure of the cursor. Similarly, for databases, such as MSSQL and DB2, that allow implicit data results, the result set metadata is scanned for metadata not anticipated by the declaration. If such metadata is found it is considered to be a implicit result set and used to determine the structure thereof.

In step 226, the data-source wizard uses the structure determined in step 224 to complement the WSDL document created in step 210. Specifically, proper XML schema can be generated for each subroutine which more properly defines the structure of the result set anticipated from the database data-source 108b. The XML schema can be used to enhance the WSDL document created in step 210 by defining the data structure of the operations.

The WSDL document and its associated XML schema can then be used to generate components of an application for further development by the developer. This can be achieved automatically using an application generation tool as described in a co-pending U.S. Patent Application Publication No. 2006/0236306. At this point there is sufficient information available to the developer and the application generation tool to properly define components of the application, such as data structures to store the data and screen elements to display the data, for example.

The following is a sample implementation of the method described above. In the present example, the database data-source 108b is a MSSQL database and it includes the following stored-procedure:

```
USE [Scott]
GO
/****** Object: StoredProcedure [scott].[GetOrder_] ******/
SET ANSI_NULLS OFF
GO
SET QUOTED_IDENTIFIER ON
GO
CREATE PROCEDURE [scott].[GetOrder_] @invno INT
   AS
BEGIN
   SELECT * FROM Orders WHERE invoiceno = @invno;
   SELECT * FROM Items WHERE invoiceno = @invno;
END;
```

Accordingly, the developer selects the data-source wizard 202, identifies the location of the database and the type of database as MSSQL 204, and connects to the database 206 to retrieve the schema metadata.

At step 208, the subroutines, including the stored-procedure scott.GetOrder_, is retrieved and in step 210, a corresponding WSDL document is generated. Referring to Appendix A, a sample WSDL document generated from the exposed stored-procedure scott.GetOrder_ is illustrated. From the WSDL document it is apparent that the database information has been configured in the binding element, the stored-procedure information has been configured in the binding element, and the input and output message information have been configured in the portType element. However, the WSDL document is of little value if it does not more accurately reflect the result set returned by the database data-source 108b.

Accordingly, in step 212, the data-source wizard determines that the stored-procedure scott.GetOrder_ is a candidate for operation since it can be handled by the data-source wizard and it may include an implicit result set since the database type is MSSQL. Therefore, the developer is presented 214 with a tree of subroutines including the stored-procedure scott.GetOrder_. The developer selects 216 the stored-procedure scott.GetOrder_ and triggers further exploration.

In step 218, it is determined that there is an input parameters for the stored-procedure scott.GetOrder_. In step 220, the developer is presented with a dialog box indicating the stored-procedure scott.GetOrder_ has an integer input. The developer enters a sample input and the stored-procedure scott.GetOrder_ is executed 222.

In step 224, the result set metadata is returned to the data-source wizard for analysis. In step 226, the data-source wizard generates XML schema from result set metadata for enhancing the WSDL document. An example of the enhanced WSDL document is provided in Appendix B. As is readily apparent in Appendix B, the definition of the result set is greatly enhanced. Specifically, it is apparent that the result comprises two parts; rs_1 and rs_2. The first part rs_1 is identified as a cursor having a defined result set structure rs_1_Rec. The second part rs_2 is identified as a cursor having a defined result set structure rs_2_Rec. Therefore, it will be apparent that two different result sets need to be configured for any subsequent applications and the developer can ensure that the application can store, display, paginate and otherwise manipulate the data accordingly.

Figure 3:
FIG. 3 is a picture of a device simulator input screen for an application developed using the data source wizard.

Referring to FIG. 3, a sample screenshot of a Blackberry simulator executing an application developed to implement the stored-procedure scott.GetOrder_ is illustrated generally by numeral 300. In the present example, the application is a basic application that allows a user to enter an invoice number and retrieve invoice information accordingly. The application includes an input screen 302 that enables the user to enter an invoice number into a text box 304, for example.

Figure 4:
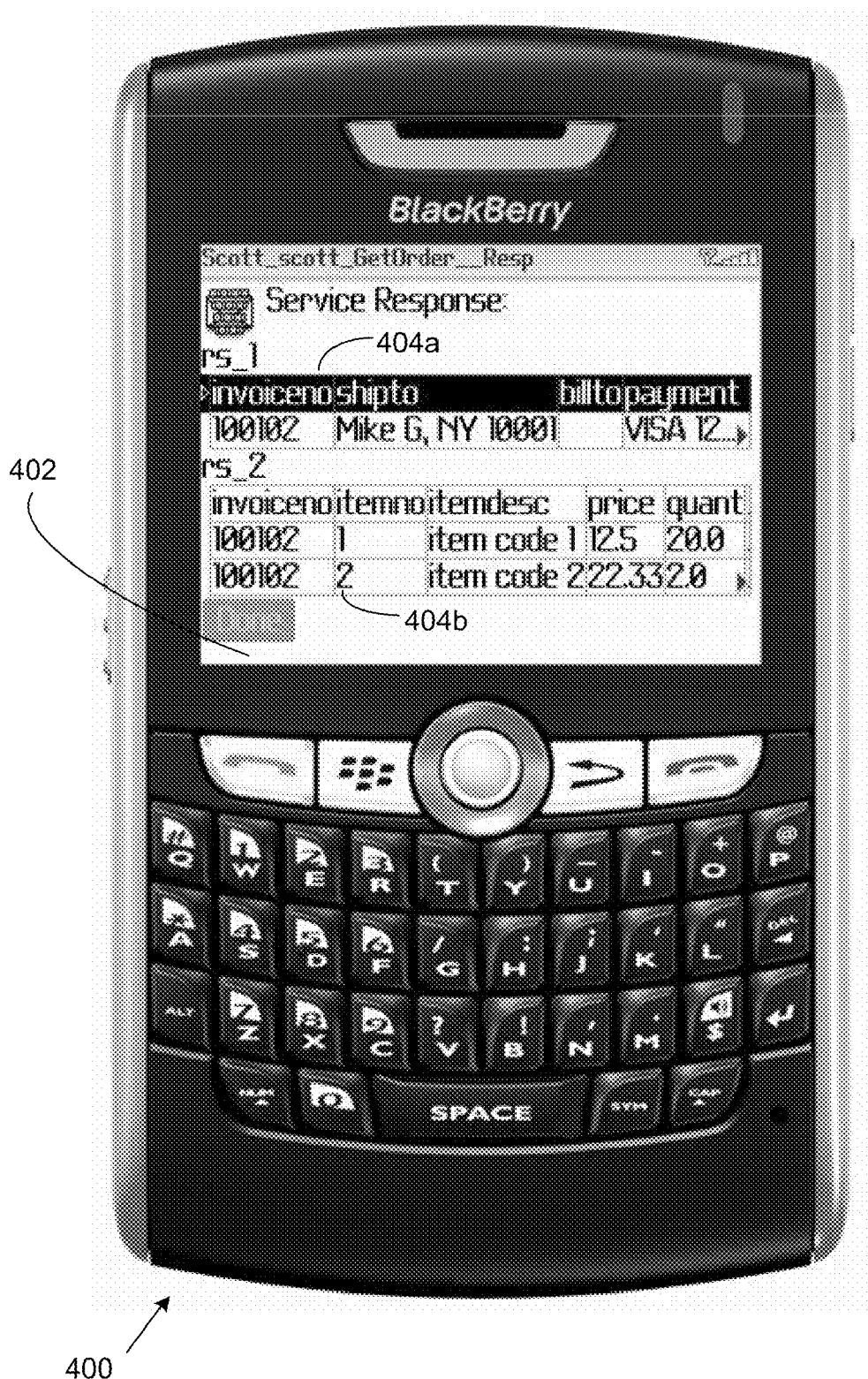
FIG. 4 is a picture of a device simulator result screen for an application developed using the data source wizard.

Referring to FIG. 4, a sample screenshot of the Blackberry simulator executing the same application is illustrated by numeral 400. In FIG. 4 a screen 402 displaying the result sets 404a and 404b to the user is shown. In the first result set 404a, the search result for rs_1 is displayed to the user. In the second result set 404b, the search result for rs_2 is displayed to the user.

If the developer had been unable to explore the database data-source to determine the result set structure, the developer would have been limited in incorporating the subroutine in the application. For example, storage and display of the result sets may be truncated or otherwise result in errors. Therefore it can be seen that the data-source wizard provides a developer with a tool to explore database data-sources where the result set structure of the response is unknown to the developer. As a result, developers do not need to develop their own database subroutines or have a priori knowledge of the result set in order to use third party subroutines relatively efficiently.

It will be appreciated by a person of ordinary skill in the art that the above example is not meant to be restrictive and is provided for illustrative purposes only. For example, although the previous embodiment describes selecting a single subroutine candidate at a time for exploration, multiple subroutines candidates may be selected simultaneously.

As another example, manual selection of subroutine candidates in steps 214 and 216 will be likely because the developer may desire only a few of the many possible subroutines candidates filtered from the database data-source 108b. However, in an alternative embodiment these steps may be automated.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Therefore, although preferred embodiments of the invention have been described herein, it will be understood by those skilled in the art that variations may be made thereto without departing from the spirit of the invention or the scope of the appended claims.

APPENDIX A

```
<?xml version="1.0" encoding="UTF-8"?>
<!--
Generated Tue Apr 24 16:54:41 EDT 2007 with BlackBerry Â ® MDS Studio 1.1.1 database Connector
from Research In Motion Limited-->
<wsdl:definitions xmlns:dbb="http://www.rim.com/wica/connector/dbBinding"
 xmlns:dbt="http://rim.net/mdss/dbtypes/2006/05/15" xmlns:impl="urn:scott.SCOTT"
 xmlns:wsdl="http://schemas.xmlsoap.org/wsdl/" xmlns:xs="http://www.w3.org/2001/XMLSchema"
 targetNamespace="urn:scott.SCOTT">
    <wsdl:message name="Scott.scott.GetOrder_Req">
        <wsdl:part name="invno" type="xs:int"/>
    </wsdl:message>
    <wsdl:message name="Scott.scott.GetOrder_Resp"/>
    <wsdl:portType name="scott.SCOTT_PortT">
        <wsdl:operation name="Scott.scott.GetOrder_">
            <wsdl:input message="impl:Scott.scott.GetOrder_Req"/>
```

APPENDIX A-continued

```
      <wsdl:output message="impl:Scott.scott.GetOrder_Resp"/>
    </wsdl:operation>
  </wsdl:portType>
  <wsdl:binding name="scott.SCOTT_Binding" type="impl:scott.SCOTT_PortT">
    <dbb:binding/>
    <wsdl:operation name="Scott.scott.GetOrder_">
      <dbb:transaction>
        <dbb:statement type="procedure">
          <dbb:sql><![CDATA[{call
"Scott"."scott"."GetOrder_"(:invno)}]]></dbb:sql>
          <dbb:in part="invno"/>
        </dbb:statement>
      </dbb:transaction>
      <wsdl:input/>
      <wsdl:output/>
    </wsdl:operation>
  </wsdl:binding>
  <wsdl:service name="pluto_1433_DatabaseName_ScottService">
    <wsdl:port name="pluto_1433_DatabaseName_Scott"
binding="impl:scott.SCOTT_Binding">
      <dbb:address location="jdbc:sqlserver://pluto:1433;DatabaseName=Scott"/>
    </wsdl:port>
  </wsdl:service>
</wsdl:definitions>
```

APPENDIX B

```
<?xml version="1.0" encoding="UTF-8"?>
<!--
Generated Tue Apr 24 16:45:22 EDT 2007
with BlackBerry Â ® MDS Studio 1.1.1 database Connector
from Research In Motion Limited-->
<wsdl:definitions xmlns:dbb="http://www.rim.com/wica/connector/dbBinding"
xmlns:dbt="http://rim.net/mdss/dbtypes/2006/05/15" xmlns:impl="urn:scott.SCOTT"
xmlns:wsdl="http://schemas.xmlsoap.org/wsdl/" xmlns:xs="http://www.w3.org/2001/XMLSchema"
targetNamespace="urn:scott.SCOTT">
  <wsdl:types>
    <xs:schema targetNamespace="urn:scott.SCOTT" elementFormDefault="qualified">
      <xs:import namespace="http://rim.net/mdss/dbtypes/2006/05/15"
schemaLocation="schemas/dbtypes.xsd"/>
      <xs:complexType name="Scott.scott.GetOrder_rs_1_Res">
        <xs:complexContent>
          <xs:extension base="dbt:cursor">
            <xs:sequence>
              <xs:element maxOccurs="unbounded"
minOccurs="0" name="item" type="impl:Scott.scott.GetOrder_rs_1_Rec"/>
            </xs:sequence>
          </xs:extension>
        </xs:complexContent>
      </xs:complexType>
      <xs:complexType name="Scott.scott.GetOrder_rs_1_Rec">
        <xs:sequence>
          <xs:element name="invoiceno" type="xs:int"/>
          <xs:element name="shipto" type="xs:string"/>
          <xs:element name="billto" type="xs:string"/>
          <xs:element name="payment" type="xs:string"/>
          <xs:element name="soldby" type="xs:short"/>
          <xs:element name="sdate" type="xs:dateTime"/>
          <xs:element name="itemstotal" type="xs:decimal"/>
        </xs:sequence>
      </xs:complexType>
      <xs:complexType name="Scott.scott.GetOrder_rs_2_Res">
        <xs:complexContent>
          <xs:extension base="dbt:cursor">
            <xs:sequence>
              <xs:element maxOccurs="unbounded"
minOccurs="0" name="item" type="impl:Scott.scott.GetOrder_rs_2_Rec"/>
            </xs:sequence>
          </xs:extension>
        </xs:complexContent>
      </xs:complexType>
      <xs:complexType name="Scott.scott.GetOrder_rs_2_Rec">
        <xs:sequence>
          <xs:element name="invoiceno" type="xs:int"/>
          <xs:element name="itemno" type="xs:int"/>
          <xs:element name="itemdesc" type="xs:string"/>
          <xs:element name="price" type="xs:decimal"/>
```

APPENDIX B-continued

```
        <xs:element name="quant" type="xs:decimal"/>
        <xs:element name="stat" type="xs:byte"/>
      </xs:sequence>
    </xs:complexType>
  </xs:schema>
</wsdl:types>
<wsdl:message name="Scott.scott.GetOrder_Req">
  <wsdl:part name="invno" type="xs:int"/>
</wsdl:message>
<wsdl:message name="Scott.scott.GetOrder_Resp">
  <wsdl:part name="rs_1" type="impl:Scott.scott.GetOrder_rs_1_Res"/>
  <wsdl:part name="rs_2" type="impl:Scott.scott.GetOrder_rs_2_Res"/>
</wsdl:message>
<wsdl:portType name="scott.SCOTT_PortT">
  <wsdl:operation name="Scott.scott.GetOrder_">
    <wsdl:input message="impl:Scott.scott.GetOrder_Req"/>
    <wsdl:output message="impl:Scott.scott.GetOrder_Resp"/>
  </wsdl:operation>
</wsdl:portType>
<wsdl:binding name="scott.SCOTT_Binding" type="impl:scott.SCOTT_PortT">
  <dbb:binding/>
  <wsdl:operation name="Scott.scott.GetOrder_">
    <dbb:transaction>
      <dbb:statement type="procedure">
        <dbb:sql><![CDATA[{call
"Scott"."scott"."GetOrder_"(:invno)}]]></dbb:sql>
        <dbb:in part="invno"/>
      </dbb:statement>
    </dbb:transaction>
    <wsdl:input/>
    <wsdl:output/>
  </wsdl:operation>
</wsdl:binding>
<wsdl:service name="pluto_1433_DatabaseName_ScottService">
  <wsdl:port name="pluto_1433_DatabaseName_Scott"
binding="impl:scott.SCOTT_Binding">
    <dbb:address location="jdbc:sqlserver://pluto:1433;DatabaseName=Scott"/>
  </wsdl:port>
</wsdl:service>
</wsdl:definitions>
```

The invention claimed is:

1. A method for facilitating development of an application having access to a database data-source, the database data-source comprising schema metadata, the method comprising the steps of:
   identifying at least one subroutine including hidden information, the hidden information comprising a metadata structure unpublished in the data-source database;
   generating a definition document for the at least one subroutine using its available schema metadata;
   executing the at least one subroutine via the database data-source;
   analysing a result set metadata of the executed at least one subroutine to reveal the metadata structure of the hidden information; and
   enhancing the definition document with the revealed metadata structure of the hidden information, the enhanced definition document for use in developing the application.

2. The method of claim 1 further comprising the step of inputting test parameters for the candidate subroutine.

3. The method of claim 2, wherein the test parameters are input by a developer.

4. The method of claim 1, wherein a plurality of subroutines are identified as candidates and the candidates are displayed to the user in a tree-view.

5. The method of claim 4, wherein the database allows weak cursors, a subroutine that includes a weak cursor in its declaration is identified as a candidate.

6. The method of claim 4, wherein the database allows implicit result sets, all subroutines are identified as candidates.

7. The method of claim 1, wherein the additional schema information relates to at least one of storage, display, or pagination of the information.

8. A computing device, comprising at least one processor, configured to implement an application development tool for facilitating development of an application having access to a database data-source, the database data-source comprising schema metadata, the application development tool providing the computing device with:
   means for identifying at least one subroutine including hidden information, the hidden information comprising a metadata structure unpublished in the data-source database;
   means for generating a definition document for the subroutine using information available from its available schema metadata;
   means for executing the subroutine via the database data-source;
   means for analysing a result set metadata of the executed subroutine to reveal the metadata structure of the hidden information; and
   means for enhancing the definition document with the revealed metadata structure of the hidden information, the enhanced definition document for use in developing the application.

9. The application development tool of claim 8 further comprising means for inputting test parameters for the candidate subroutine.

10. The application development tool of claim 9, wherein the test parameters are input by a developer.

11. The application development tool of claim 8, wherein a plurality of subroutines are identified as candidates and the candidates are displayed to the user in a tree-view.

12. The application development tool of claim 11, wherein the database allows weak cursors, a subroutine that includes a weak cursor in its declaration is identified as a candidate.

13. The application development tool of claim 11, wherein the database allows implicit result sets, all subroutines are identified as candidates.

14. The method of claim 8, wherein the additional schema information relates to at least one of storage, display, or pagination of the information.

15. A computer readable medium comprising instructions for facilitating development of an application having access to a database data-source, the database data-source comprising schema metadata, which, when executed by a computing device, cause the computing device to implement the steps of:
 identifying at least one subroutine including hidden information, the hidden information comprising a metadata structure unpublished in the data-source database;
 generating a definition document for the at least one subroutine using its available schema metadata;
 executing the at least one subroutine via the database data-source;
 analysing a result set metadata of the executed at least one subroutine to reveal the metadata structure of the hidden information; and
 enhancing the definition document with the revealed metadata structure of the hidden information, the enhanced definition document for use in developing the application.

16. The computer readable medium of claim 15 further comprising the step of inputting test parameters for the candidate subroutine.

17. The computer readable medium of claim 16, wherein the test parameters are input by a developer.

18. The computer readable medium of claim 15, wherein a plurality of subroutines are identified as candidates and the candidates are displayed to the user in a tree-view.

19. The computer readable medium of claim 18, wherein the database allows weak cursors, a subroutine that includes a weak cursor in its declaration is identified as a candidate.

20. The computer readable medium of claim 18, wherein the database allows implicit result sets, all subroutines are identified as candidates.

\* \* \* \* \*